Figure 1:
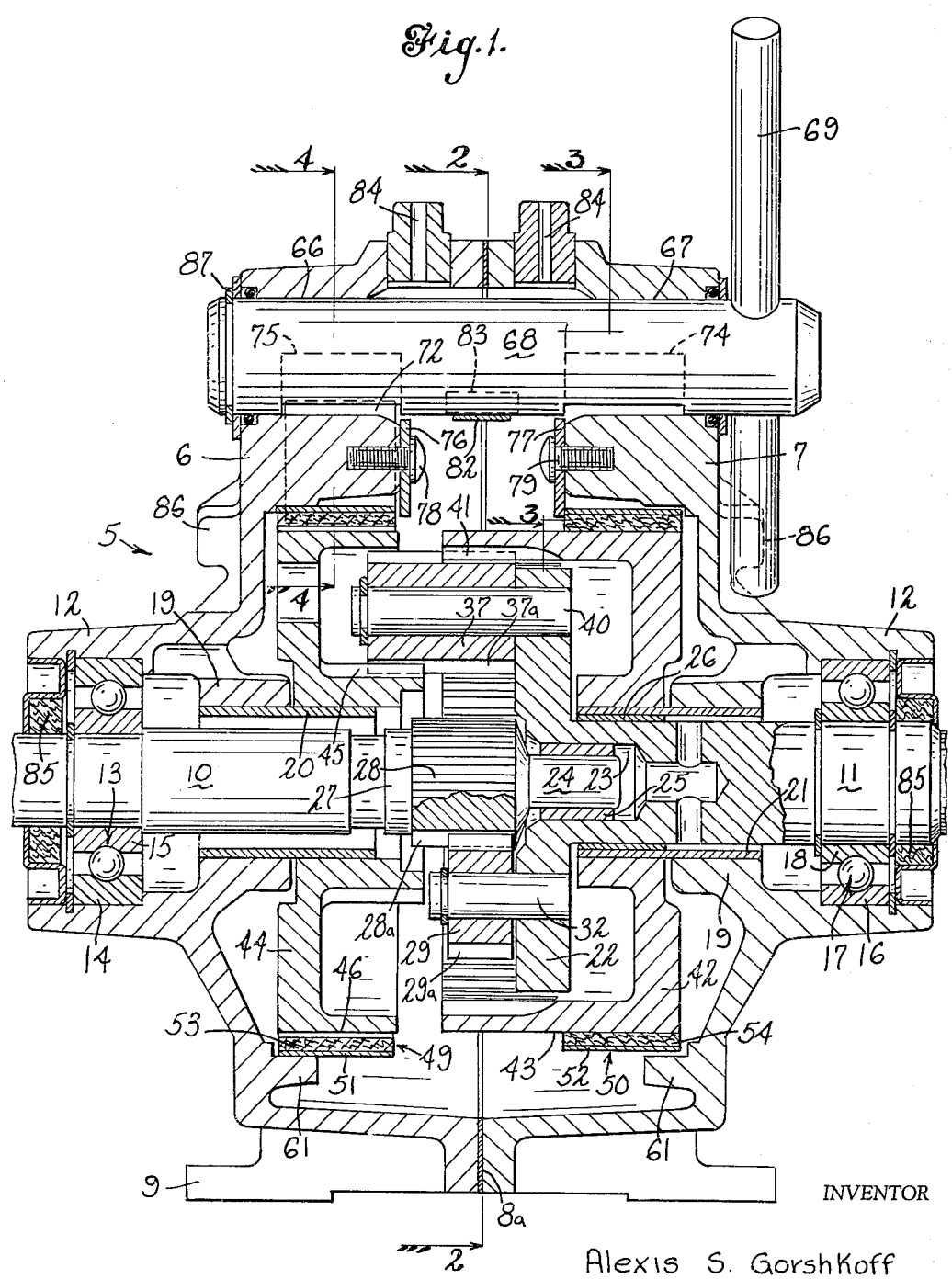

Nov. 2, 1965  A. S. GORSHKOFF  3,215,003
REVERSIBLE TRANSMISSION MECHANISM
Filed Sept. 5, 1962  3 Sheets-Sheet 1

INVENTOR
Alexis S. Gorshkoff
BY Spencer, Rockwell & Bartholow
ATTORNEYS

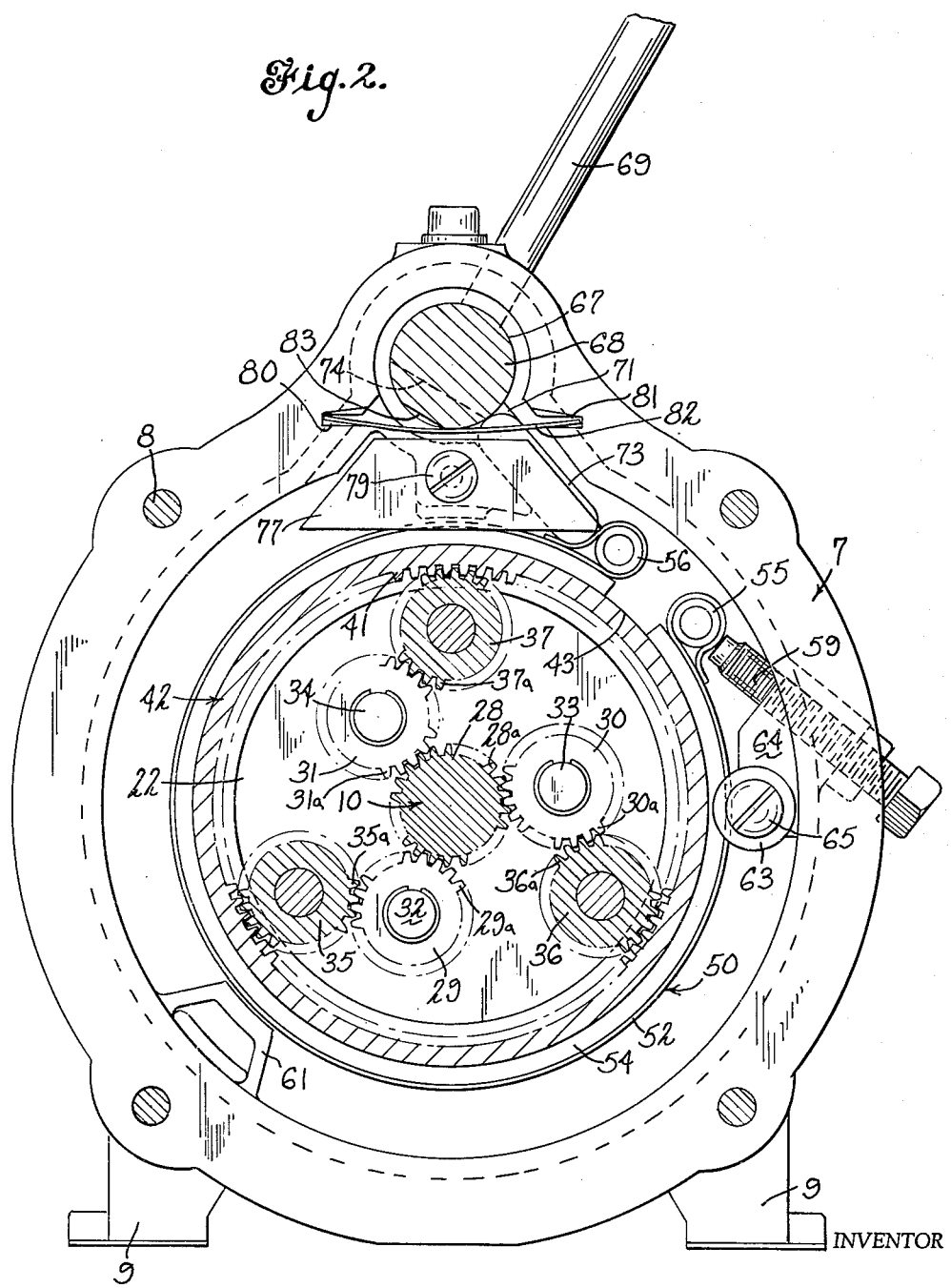

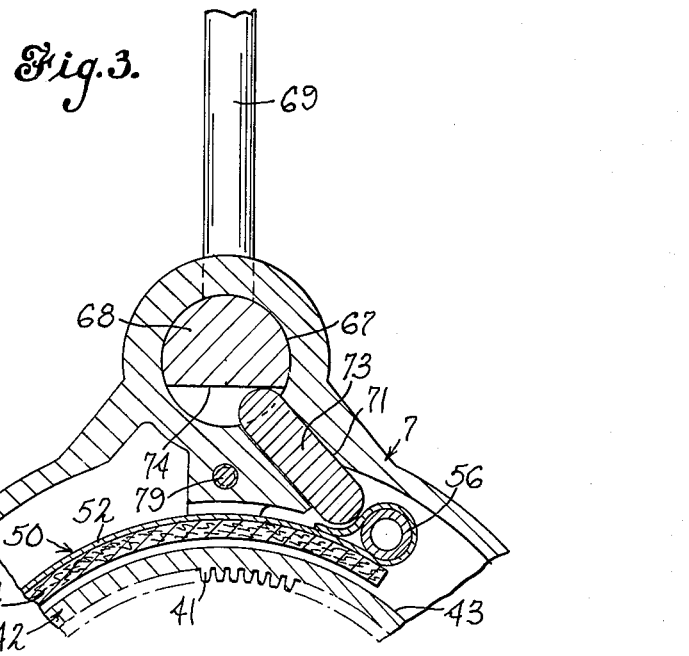

United States Patent Office 3,215,003
Patented Nov. 2, 1965

3,215,003
REVERSIBLE TRANSMISSION MECHANISM
Alexis S. Gorshkoff, Oxford, Conn., assignor to The Snow-Nabstedt Gear Corporation, Hamden, Conn.
Filed Sept. 5, 1962, Ser. No. 221,470
4 Claims. (Cl. 74—760)

This invention relates to transmission mechanisms and more particularly relates to reversible gear transmission mechanisms.

A transmission mechanism of the type to which this invention pertains comprises axially aligned driving and driven shafts rotatably supported in a housing between a driving member and a driven member. A driving gear is mounted on the driving shaft and is arranged to rotatably engage first selected pinions mounted in a pinion cage connected to the driven shaft. Coaxially rotatable about the driving shaft is a first gear engaging second selected pinion gears carried in the pinion cage and coaxially rotatably mounted about the driven shaft is a second gear also engaging the second selected pinions. The first selected pinions and the second selected pinions are always in engagement. Reversing means are provided which selectively block rotation of either of the first or the second gears thereby causing the second selected pinions to rotate about the blocked gear and cause rotation of the pinion cage which causes rotation of the driven shaft connected thereto in a direction dependent on which of the gears is blocked.

Transmission mechanism of the aforementioned type is disclosed in U.S. Patent 2,370,484, and in certain respects this invention presents improvements over the transmission mechanism described in that patent.

It is an object of this invention to provide a new and improved transmission unit of the type described.

It is another object of this invention to provide a new and improved transmission mechanism of the type described which is so constructed as to simplify assembly thereof and to minimize undesired effects of side thrust of the various gears and pinions.

It is a further object of this invention to provide new and improved reversing means for a transmission mechanism of the type described.

It is a still further object of the invention to provide a new and improved transmission mechanism of the type described of simplified and economical construction.

Accordingly, the invention comprises the combination and cooperation of elements of a transmission mechanism as hereinafter described and exemplified.

The features of the invention which are believed to be novel are pointed out with particularity in the claims appended to and forming part of this specification. However, the invention, both as to its organization and operation, together with further objects and advantages thereof, may best be appreciated by reference to the following description taken in conjunction with the drawings, wherein:

FIG. 1 is a side elevation, in section, of a transmission unit embodying the invention, FIG. 2 is a view seen along section 2—2 of FIG. 1, FIG. 3 is a view seen along section 3—3 of FIG. 1, and FIG. 4 is a view seen along section 4—4 of FIG. 1.

The transmission mechanism, selected for purposes of disclosure, with initial reference to FIG. 1, comprises a transmission unit 5 comprising preferably identical frame members 6 and 7 of generally cup-shape configuration which are adapted to be joined together at their open ends by suitable fastening means as indicated by bolts 8. An annular sealing member 8a may be included between the frame members 6 and 7. Where necessary frame members 6 and 7 may be provided with legs 9. Rotatably mounted in each of the frame members are coaxial shafts 10 and 11, on of which is adapted upon rotation thereof to cause rotation of the other shaft. Hereinafter shaft 10 will be referred to as a driving or input shaft adapted to receive power from a prime mover or other driving means, not shown, and shaft 11 as a driven or output shaft adapted to deliver power to a utilization means, not shown. Both the driving and driven shafts are rotatable about and aligned with a common axis. Defined in each of the frame members 6 and 7, is a bearing mount or bracket 12. Bearing bracket 12 of frame member 6 has an antifriction bearing assembly 13 mounted therein. Antifriction bearing assembly 13 has its outer race 14 non-rotatably received in bearing bracket 12 and its inner race 15 mounted on shaft 10 for rotation therewith. Bearing bracket 12 or frame member 7 has the outer race 16 of an antifriction bearing assembly 17 non-rotatably mounted therein. The inner race 18 of bearing assembly 17 is mounted on shaft 11 for rotation therewith. Each of the frame members 6 and 7 further define a cylindrical bearing mount 19, each having a sleeve bearing 20 and 21, respectively, nonrotatably received therein, which sleeve bearings extend inwardly of the transmission unit 5 from their mounting positions in accordance with an aspect of the invention as hereinafter pointed out. Driven shaft 11 extends into a pinion cage or carrier member 22 and shaft 11 further defines an axial recess 23 therein adapted to receive portion 24 of shaft 10 therein. A sleeve-type bearing 25 is positioned in the recess to align shafts 10 and 11 and render them mutually self-supporting and relatively rotatable. It is to be understood that pinion carrier 22 may be formed as a separate member and then secured to shaft 11. A bearing 26 is provided between shaft 11 and sleeve bearing 21 to aid in supporting shaft 11.

Mounted on portion 27 of shaft 10 for rotation therewith is a spur-driving gear 28 having gear teeth 28a thereon which drivingly mesh with gear teeth 29a, 30a and 31a of pinions 29, 30 and 31, respectively, as most clearly seen in FIG. 2. The pinions 29, 30 and 31 which are hereinafter referred to as short pinions are rotatably mounted on pinion shafts 32, 33 and 34, respectively, which are nonrotatably mounted on and carried by pinion carrier 22. Each of the short pinions 29, 30 and 31 meshes with another pinion hereinafter referred to as long pinions 35, 36 and 37, respectively, which are rotatably mounted on similar pinion shafts mounted in and nonrotatably supported on pinion carrier 22. The gear teeth 35a, 36a and 37a of long pinions 35, 36 and 37, respectively, mesh with a ring gear 41 defined on the inner annular surface of a gear member 42, which is rotatably mounted on sleeve bearing 21 about shaft 11. The gear member 42 further provides a cylindrical braking surface 43 for reasons hereinafter set forth.

Mounted on the extending portion of sleeve bearing 20 is a gear member 44 having gear teeth 45 engaging the teeth 35a, 36a and 37a of long pinions 35, 36 and 37, respectively. Gear member 44 also provides a cylindrical braking surface 46 for reasons hereinafter explained.

Braking means are provided which cooperate with each of the braking surfaces 43 and 46, respectively. The braking means each comprise brake bands 49 and 50 each of which include a backing member 51 and 52 of spring metal in the form of a split ring and friction or brake liner members 53 and 54, all respectively.

Provided on the ends of brake band 50 are tensioning means shown as abutments or lugs 55 and 56 which are utilized to tension brake band 50 about braking surface 43. As illustrated, the members 55 and 56 may comprise a pin or other cylindrical member having the backing member 52 wrapped thereabout and welded or otherwise secured to itself. The form of the members 55 and 56 is not important so long as they provide a means for exerting a force having a substantial tangential component on the brake band to tension the band about braking surface. Brake band 49, as shown most clearly in FIG. 4, is constructed in the same manner as brake band 50 with tensioning means also shown as abutments or lugs 57 and 58. Means are provided to adjustably position each of the brake bands 49 and 50 which, as illustrated, comprise bolts 59 (FIG. 2) and 60 (FIG. 4) each threadably received through frame members 7 and 6 respectively. Bolt 59 cooperates with lug 55 of brake band 50 and bolt 60 cooperates with lug 57 of brake band 49. In each of the frame members 6 and 7, a brake band support 61 is provided to aid in supporting the brake bands 49 and 50 about their associated braking surfaces 46 and 43. Washer-like member 63 is secured to a lug 64 extending from the outer walls of the frame members by a screw or bolt 65 to longitudinally position and retain each of the brake bands.

In accordance with one aspect of the invention, new and improved means are provided for selectively controlling the direction of rotation of driven shaft 11.

Each of the frame members 6 and 7 has an annular passage 66 and 67, respectively, defined therein adapted to receive a forward-reverse actuating shaft 68 having an actuating lever 69 thereon extending therethrough at one end thereof. As most clearly seen in FIGS. 3 and 4, each of the frame members 6 and 7 further define a passage or slot 70 and 71, respectively, providing communication between the passages 66 and 67 and the interior of the frame. Each of the slots 70 and 71 receive a freely sliding plunger 72 and 73 respectively. Plungers 72 and 73 are arranged to be received at the upper ends thereof in cut-outs or flats 74 and 75, respectively, defined in shaft 68.

As illustrated in FIG. 3, when the actuating shaft 68 and lever 69 are in the position shown, the transmission unit 5 is in a neutral position with neither of the brake bands 49 or 50 engaging its respective braking surface 46 or 43 and rotation of the driving shaft 10 will not cause rotation of the driven shaft 11 inasmuch as both of gear members 42 and 44 are free to rotate about their respective bearings 20 and 21. By blocking or otherwise preventing rotation of one of the gear members 42 and 44, the direction of rotation of shaft 11 is selected. If lever 68 should be moved to the position shown in FIG. 2, plunger 73 in slot 71 of frame member 7 will be cammed or forced by shaft 68 against abutment or lug 56 of brake band 50 tensioning brake band 50 and liner 54 thereof about braking surface 43 and prevent rotation of gear member 42. Under this condition of operation, when shaft 10 is rotated, gear 28 drives short pinions 29, 30 and 31, which in turn drive long pinions 35, 36 and 37 and cause them to revolve within ring gear 41 on gear member 42. As the long pinions 35, 36 and 37, revolve within ring gear 42, the long pinions cause rotation of pinion carrier 22 which in turn produces rotation of driven shaft 11 in response to rotation of shaft 10. During this mode of operation, gear member 44 is free to idle on sleeve bearing 20. It may be seen that under this condition of operation gear 41 acts as a fulcrum gear.

Assume now, that the actuating lever 69 is placed in the position shown in FIG. 4 which causes shaft 68 to cam or force plunger 72 against abutment or lug 58 of brake band 49 which tensions brake band 49 about braking surface 46 on gear member 44 and prevents rotation thereof. When lever 69 is placed in the position shown in FIG. 4, shaft 68 will exert no force on plunger 73 to tension brake band 50 inasmuch as plunger 73 will be received in cut out 74. Therefore gear member 42 is free to rotate. As shaft 10 rotates in the same direction for the condition of operation previously discussed and drives gear 28, gear 28 drives short pinions 29, 30 and 31 which in turn drive long pinions 35, 36 and 37. However, during this mode of operation, gear member 42 is free to rotate and idle on sleeve bearing 21 and long pinions 35, 36 and 37 will revolve about gear 45, which acts as a fulcrum gear, thus producing rotation of pinion carrier 22 in an opposite direction to that previously described. Thus, by placing lever 69 in the position shown in FIG. 2 or the position shown in FIG. 4, the direction of rotation of output shaft 11 may be predetermined.

To insure that the plungers 72 and 73 are retained in their respective slots 70 and 71, retaining plates 76 and 77 may be secured to frame members 6 and 7 by means of bolts 78 and 79, respectively, threaded into the frame members 6 and 7. It will be further noted by reference to FIG. 2, that the retaining members 76 and 77 may be extended downwardly to aid in positioning and retaining the brake bands 49 and 50, in their respective positions.

Defined in the upper portion of each of the frame members 6 and 7 are slots 80 and 81 arranged to receive a flat spring member 82 which functions as a detent spring in cooperation with a flat 83 defined on shaft 68 to hold shaft 68 in the neutral position, shown in FIG. 3, unless lever 69 is positioned to select a direction of rotation of shaft 11.

The actuating shaft 68, plungers 72 and 73, brake bands 49 and 50 and associated elements are so selected and dimensioned that when shaft 68 is in the neutral position, as illustrated in FIG. 3, sufficient clearance is provided for both brake bands 49 and 50 to be disengaged from their respective braking surfaces 46 and 43. The flats 74 and 75 are preferably so selected and arranged that by rotating lever 69 approximately 30° from the vertical in either direction, the direction of rotation of shaft 11 is selected.

The proper tension in each of the brake bands 49 and 50 may be easily provided by adjustment of the tension adjusting bolts 60 and 59 respectively.

Inasmuch as the frame members 6 and 7 are made identical, they may be easily sealed together to retain lubricant therein. To allow introduction of lubricant into the unit 5, a port 84 is provided in each frame member. To prevent any leakage of lubricant from the unit about the shafts, oil seals 85 are provided about shafts 10 and 11 adjacent the bearing assemblies 13 and 17. The elements of the transmission unit may be kept well lubricated since the frame members provide a lubricant retaining reservoir and rotation of the various elements will continuously carry lubricant to all elements requiring lubrication.

The reversing mechanism described is very positive and rapid in operation and the direction of rotation of driven shaft 11 for a given direction of rotation of driving shaft 10 may be very quickly reversed, without first stopping rotation of shaft 11 in the direction it is rotating, merely by actuating lever 69 between the positions shown in FIGS. 2 and 4. Lugs 86, shown in FIG. 1, may be provided on frame members 6 and 7, to limit movement of lever 69 and hence shaft 68.

The disclosed transmission mechanism offers the important advantage of simplicity of design inasmuch as the frame members 6 and 7 are identical and all parts located in each of the respective frame members may be assembled therein before the frame members 6 and 7 are assembled together. Then the frame members 6 and 7 may be brought and secured together and the actuating shaft 68 mounted therein and longitudinally secured therein by means of locking washer 87. Also, inasmuch as the frame members are identical and of substantially cup-shape they may be economically produced on a large scale such as by die casting.

The construction of the disclosed transmission unit provides a significant operating advantage in that the side thrust of the pinions on gear member 42 when rotation of gear member 42 is prevented, is transmitted to and accepted by the frame members since gear member 42 is rotatably mounted on sleeve bearing 21 secured in the frame. This construction eliminates the application of the side thrust of the pinions to the output shaft as would be the case if the gear member 42 were rotatably mounted on output shaft 11 and thereby eliminates the tendency of such side thrust to cause gear misalignment, deflections and undesired stresses in the pinion carrier structure.

While the shafts 10 and 11 have been referred to as driving and driven, respectively, it will be apparent that either could be the input shaft and the other the output shaft. Moreover, the gear ratios of the various gears and pinions may be selected to give a desired input-output speed ratio.

The invention, for purposes of disclosure, has been shown in a preferred embodiment thereof. Modifications to the disclosed embodiment of the invention as well as other embodiments thereof may occur to those skilled in the art which do not depart from the spirit and scope of the invention. Accordingly, it is intended in the appended claims to cover all modifications of the disclosed embodiment of the invention, together with other embodiments thereof which do not depart from the spirit and scope of the invention.

What is claimed is:

1. In a transmission mechanism of the type described comprising axially aligned driving and driven shafts rotatably mounted in a housing member, a gear member rotatably mounted about each of said shafts and adapted to be selectively braked and rendered nonrotative so as to provide a fulcrum, each of said gear members providing a cylindrical braking surface, braking means about each of said surfaces adapted to be selectively tensioned about the associated surface to prevent rotation of the associated gear member, a driving gear fixed to said driving shaft, a pinion cage on said driven shaft, and two sets of pinions rotatably mounted on said pinion cage, one set engaging said driving gear and the other set of pinions, the last-mentioned set meshing with both of said gear members, the improvement comprising: a reversing shaft rotatably mounted in said housing, tensioning means movably carried in guide means defined in said housing between said reversing shaft and each of said braking means, said reversing shaft having recesses defined therein receiving one end of each of said tensioning means, whereby rotation of said reversing shaft in a first direction forces one of said tensioning means to engage the associated braking means and tension it about the braking surface of the associated gear member and rotation of said reversing shaft in the other direction forces the other of said tensioning means to engage the other of said braking means and tension it about the braking surface of the other gear member.

2. A transmission unit comprising driving and driven shafts and a housing, a driving gear fixed to one of said shafts and a cage fixed to the other of said shafts, sets of pinions in planetary arrangement carried by the cage and rotated on their axis from said driving gear, and fulcrum gears coacting with certain of the pinions and normally freely rotatable but adapted to be selectively locked in fixed position so as to obtain forward drive or reversal of the driven shaft, the pinions of one set including a pinion engaging at one end portion with one fulcrum gear and at the other end portion with the other fulcrum gear, said housing providing means for rotatably mounting said shafts therein at opposite ends thereof, said housing providing means coaxial with each of said shafts and radially spaced therefrom, each of said fulcrum gears being rotatably mounted on one of said last mentioned means, each of said fulcrum gears providing a cylindrical braking surface, means supporting a brake band about each of said surfaces, each of said brake bands having an abutment at one end thereof, a reversing shaft mounted longitudinally in said housing for limited rotation therein, tensioning means movably carried in guide means defined in said housing between said reversing shaft and each of said abutments, said reversing shaft having recesses defined therein receiving one end of said tensioning means, whereby rotation of said reversing shaft in a first direction forces one of said tensioning means to engage its associated abutment and tension the associated brake band about the braking surface of one of said fulcrum gears and rotation of said reversing shaft in the other direction forces the other of said tensioning means to engage its associated abutment on the second brake band and tension the second brake band about the braking surface of the other of said fulcrum gears.

3. The mechanism of claim 2 wherein said recesses in said reversing shaft comprise cutouts therein having a surface horizontal when said reversing shaft is in a neutral position and means for yieldingly retaining said reversing shaft in a neutral position.

4. The mechanism of claim 2 wherein means are provided for adjusting the tension of each of said brake bands.

References Cited by the Examiner

UNITED STATES PATENTS

| 626,445 | 6/99 | Smith | 74—781 |
|---|---|---|---|
| 2,209,120 | 7/40 | Hoffman | 74—801 |
| 2,370,484 | 2/45 | Nabstedt | 74—760 |
| 2,692,516 | 10/54 | O'Leary | 74—761 |
| 2,902,888 | 9/59 | Powischill et al. | 74—760 |
| 2,925,134 | 2/60 | Cunningham | 74—768 |
| 2,971,385 | 2/61 | Miller | 74—761 |

DON A. WAITE, *Primary Examiner.*